United States Patent
Xu et al.

(10) Patent No.: US 11,330,252 B2
(45) Date of Patent: May 10, 2022

(54) APPARATUS AND METHOD FOR PROVIDING CONTENT WITH MULTIPLANE IMAGE TRANSCODING

(71) Applicant: AT&T Intellectual Property I, L.P., Atlanta, GA (US)

(72) Inventors: Tan Xu, Bridgewater, NJ (US); Bo Han, Bridgewater, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 109 days.

(21) Appl. No.: 16/788,405

(22) Filed: Feb. 12, 2020

(65) Prior Publication Data
US 2021/0250571 A1 Aug. 12, 2021

(51) Int. Cl.
*H04N 13/395* (2018.01)
*H04N 13/117* (2018.01)
*G06F 3/04815* (2022.01)
*H04N 21/6587* (2011.01)
*H04N 21/81* (2011.01)

(52) U.S. Cl.
CPC ....... *H04N 13/395* (2018.05); *G06F 3/04815* (2013.01); *H04N 13/117* (2018.05); *H04N 21/6587* (2013.01); *H04N 21/816* (2013.01)

(58) Field of Classification Search
CPC ............. H04N 13/395; H04N 21/6587; H04N 13/117; H04N 21/816; H04N 13/194; H04N 21/21805; H04N 13/279; G06F 3/04815
See application file for complete search history.

(56) References Cited

U.S. PATENT DOCUMENTS

| | | | | |
|---|---|---|---|---|
| 10,033,992 | B1* | 7/2018 | McGowan | H04N 13/361 |
| 2012/0320169 | A1* | 12/2012 | Bathiche | G06F 3/012 |
| | | | | 348/53 |
| 2013/0132462 | A1* | 5/2013 | Moorer | H04N 21/47217 |
| | | | | 709/203 |
| 2017/0094262 | A1* | 3/2017 | Peterson | H04N 13/344 |
| 2017/0142480 | A1* | 5/2017 | Gupta | H04N 21/458 |
| 2017/0316606 | A1* | 11/2017 | Khalid | G06F 3/011 |

(Continued)

OTHER PUBLICATIONS

Tinghui Zhou, Richard Tucker, John Flynn, Graham Fyffe, Noah Snavely, "Stereo Magnification: Learning View Synthesis using Multiplane Images", May 24, 2018. (Year: 2018).*

(Continued)

*Primary Examiner* — Michael Le
(74) *Attorney, Agent, or Firm* — Guntin & Gust, PLC; Mark Wilinski

(57) ABSTRACT

Aspects of the subject disclosure may include, for example, transmitting viewpoint information associated with a first portion of a three-dimensional (3D)/volumetric video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device. Other embodiments are disclosed.

20 Claims, 10 Drawing Sheets

(56) References Cited

U.S. PATENT DOCUMENTS

2019/0200058 A1* 6/2019 Hall ..................... H04N 21/251

OTHER PUBLICATIONS

F Qian, B Han, Q Xiao, V Gopalakrishnan, "Flare: Practical Viewport-Adaptive 360-Degree Video Streaming for Mobile Devices", Proceedings of the 24th, MobiCom'18, Oct. 29-Nov. 2, 2018. (Year: 2018).*
"Deep View: View Sysnthesis with Learned Gradient Descent—You Tube", https://www.youtube.com/watch?v=UD719gXIVsc&feature=youtu.be, Jun. 15, 2019, 2 pages.
"Flare: Practical Viewport-Adaptive 360-Degree Video Streaming for Mobile Devices", Conference: the 24th Annual International Conference, Oct. 2018, 11 pages.
"Holograms Without the Headgear", https://lookingglassfactory.com, Jan. 9, 2020, 5 pages.
"Toward Practical Volumetric Video Streaming on Commodity Smartphones", Conference: the 20th International Workshop, Feb. 2019, 7 pages.
"Video Transcoding, Evolved.", Transcoding Platform/Mux, Jan. 30, 2020, 9 pages.
Xu, Tan et al., "Analyzing viewport prediction under different VR interactions", Computer Science, 2019, 5 pages.

* cited by examiner

200e

200d

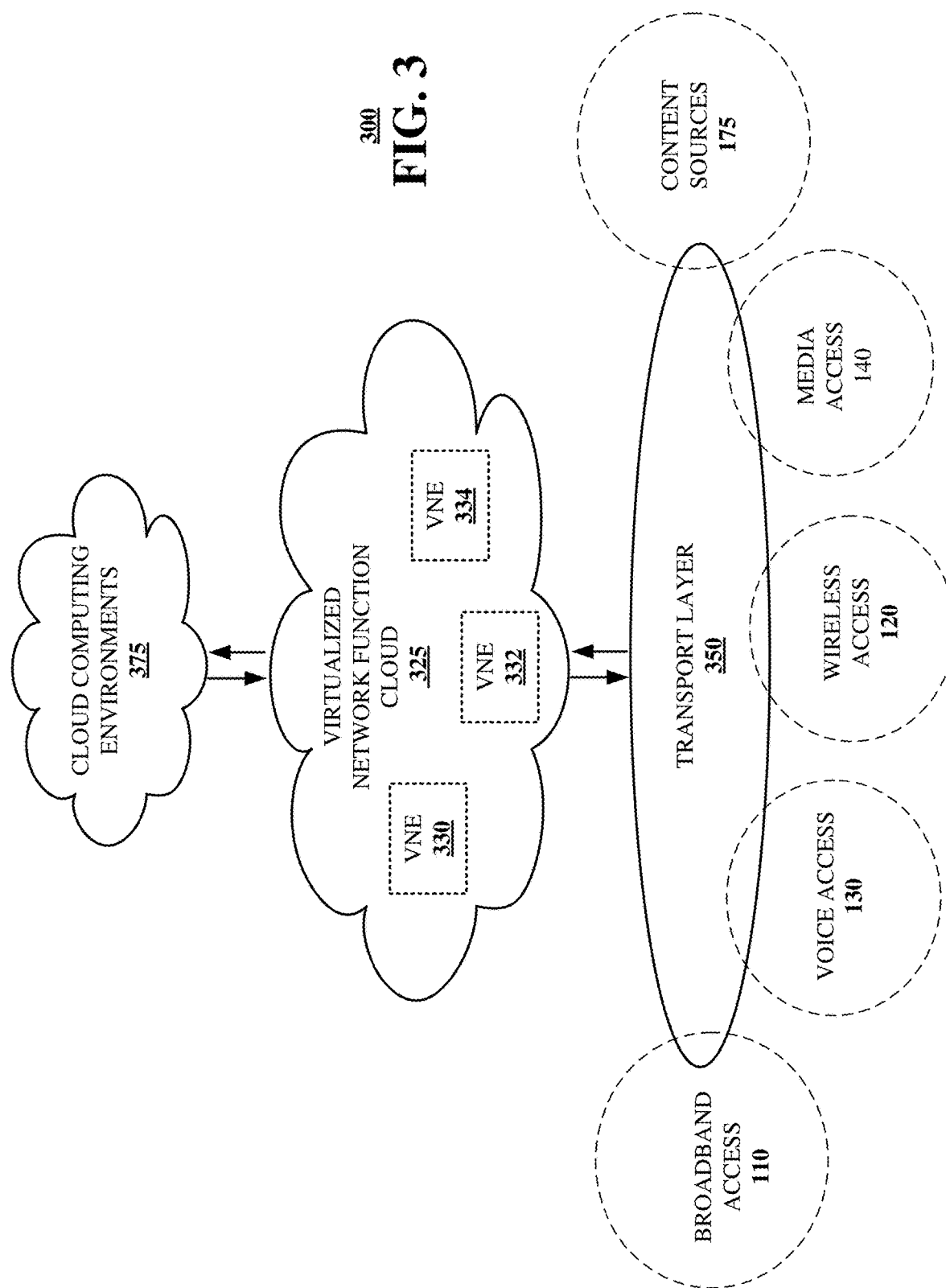

APPARATUS AND METHOD FOR PROVIDING CONTENT WITH MULTIPLANE IMAGE TRANSCODING

FIELD OF THE DISCLOSURE

The subject disclosure relates to an apparatus and method for providing content with multiplane image (MPI) transcoding.

BACKGROUND

As the world becomes increasingly connected over vast communication networks, additional opportunities are presented to target content to users. For example, volumetric videos (VVs) capture a three-dimensional (3D) scene and enable six degrees of freedom (6 DoF) in terms of changing/modifying/altering a viewpoint during playtime/playback. Many applications utilize a streaming transport service/mechanism to deliver the VVs to communication devices, such as client devices/user equipment. However, streaming VVs presents a number of challenges. For example, there is currently no known canonical representation of VVs which is computationally and memory efficient, while simultaneously providing a high degree of resolution in accordance with an arbitrary topology. Even subjecting VVs to a compression technology, the (compressed) VVs still demand large amounts of bandwidth, and thus, represent a large cost to a network operator/service provider in terms of network resource utilization/provisioning. Unlike two-dimensional (2D) videos that can be decoded using dedicated hardware, a decoding of VVs represents a significant load in terms of overhead in connection with software processing resources. Furthermore, adaptive-bitrate (ABR) video streaming systems typically have a number of parameters associated therewith, such as rate adaptation, quality-of-experience (QoE) inferences, and buffer controls. Realizing such ABR-based parameters can prove difficult in connection with conventional technologies.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
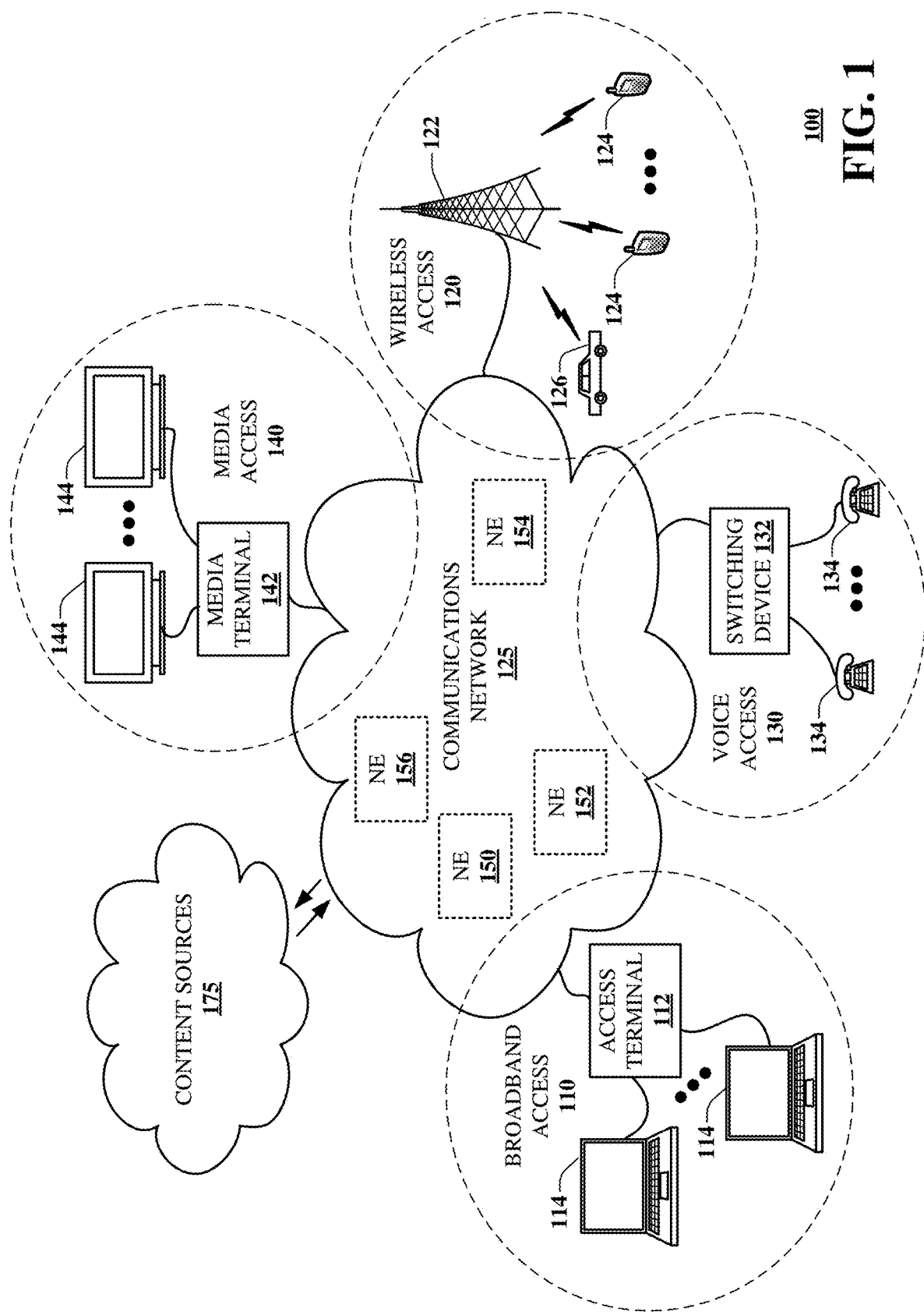
FIG. 1 is a block diagram illustrating an exemplary, non-limiting embodiment of a communications network in accordance with various aspects described herein.

The subject disclosure describes, among other things, illustrative embodiments for preserving resources associated with communication devices and networks in connection with one or more three-dimensional/volumetric content items. Other embodiments are described in the subject disclosure.

One or more aspects of the subject disclosure include identifying a first portion of a volumetric video to be provided to a communication device, obtaining a first representation of the first portion of the volumetric video based on the identifying, obtaining viewpoint information associated with a second portion of the volumetric video from the communication device, processing the viewpoint information to generate a predicted viewpoint associated with the first portion of the volumetric video, generating a second representation of the first portion of the volumetric video based on the predicted viewpoint, wherein the second representation comprises a first multiplane image (MPI) representation of a first part of the first portion of the volumetric video, and providing the second representation of the first portion of the volumetric video to the communication device.

One or more aspects of the subject disclosure include transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device.

One or more aspects of the subject disclosure include obtaining, by a processing system including a processor, a first representation of a first portion of a content item that is compatible with a three-dimensional (3D) space, obtaining, by the processing system, information indicative of a first orientation of a user during a presentation of a second portion of the content item at a user equipment, analyzing, by the processing system, the information to generate a prediction of a second orientation of the user during a presentation of the first portion of the content item at the user equipment, transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation, and transmitting, by the processing system, the second representation of the first portion of the content item to the user equipment to facilitate the presentation of the first portion of the content item at the user equipment.

Referring now to FIG. 1, a block diagram is shown illustrating an example, non-limiting embodiment of a system 100 in accordance with various aspects described herein. For example, system 100 can facilitate in whole or in part identifying a first portion of a volumetric video to be provided to a communication device, obtaining a first representation of the first portion of the volumetric video based on the identifying, obtaining viewpoint information associated with a second portion of the volumetric video from the communication device, processing the viewpoint information to generate a predicted viewpoint associated with the first portion of the volumetric video, generating a second representation of the first portion of the volumetric video based on the predicted viewpoint, wherein the second representation comprises a first multiplane image (MPI) representation of a first part of the first portion of the volumetric video, and providing the second representation of the first portion of the volumetric video to the communication device. System 100 can facilitate in whole or in part transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device. System 100 can facilitate in whole or in part obtaining, by a processing system including a processor, a first representation of a first portion of a content item that is compatible with a three-dimensional (3D) space, obtaining, by the processing system, information indicative of a first orientation of a user during a presentation of a second portion of the content item at a user equipment, analyzing, by the processing system, the information to generate a prediction of a second orientation of the user during a presentation of the first portion of the content item at the user equipment, transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation, and transmitting, by the processing system, the second representation of the first portion of the content item to the user equipment to facilitate the presentation of the first portion of the content item at the user equipment.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
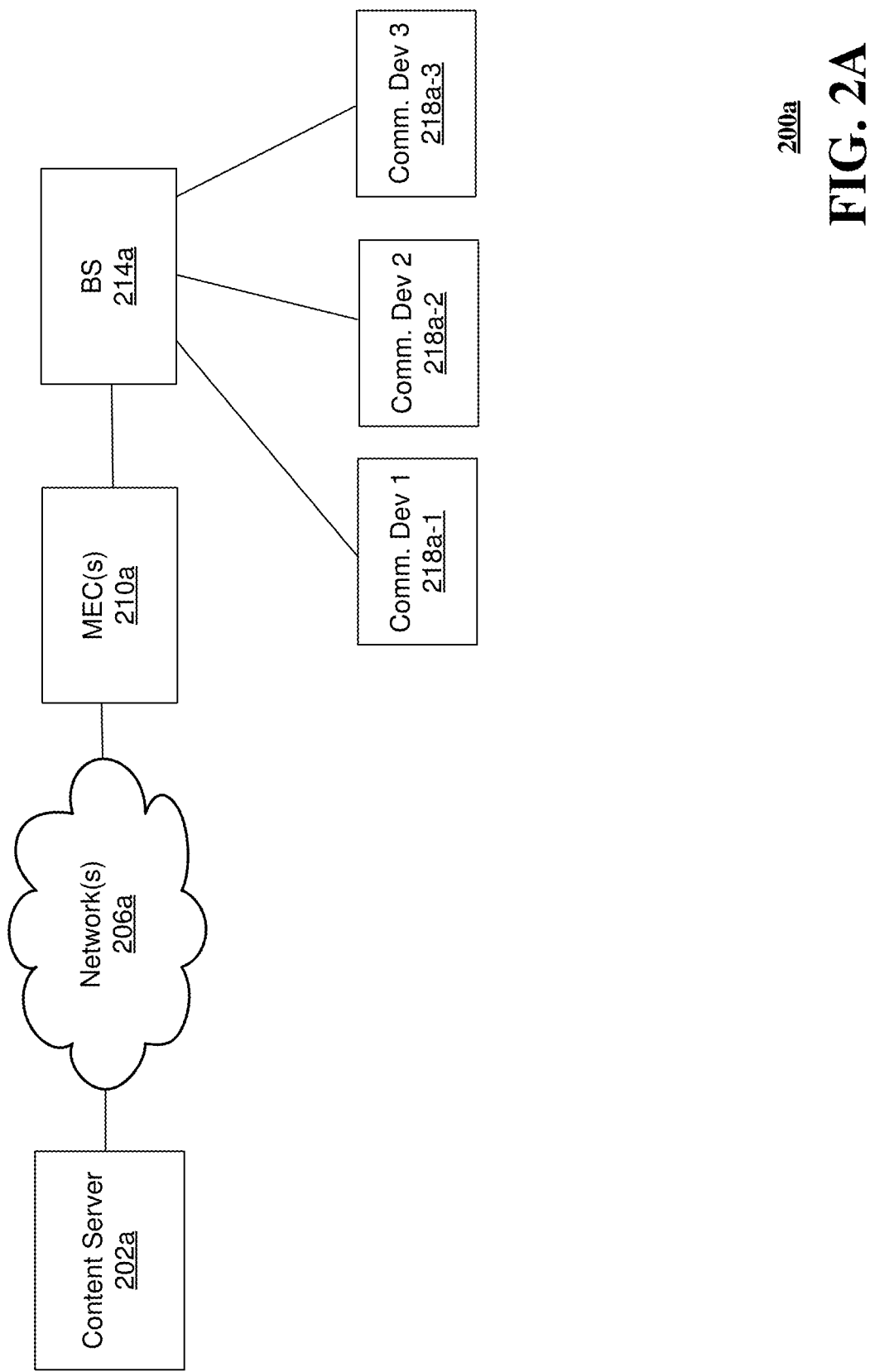
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. As described in further detail below, the system 200a may be configured to distribute content, such as one or more volumetric videos (VVs), to one or more communication devices (e.g., one or more routers, modems, switches, client devices/user equipment, etc.).

As shown in FIG. 2A, the system 200a may include a media/content server 202a, one or more networks 206a, one or more mobile edge computing (MEC) devices 210a, a base station (BS) 214a, and one or more communication devices, such as for example a first communication device 218a-1, a second communication device 218a-2, and a third communication device 218a-3. The content server 202a may store data that is representative of one or more content items, such as for example a video, an audio track, still-frame images, advertisements, messages (e.g., voice messages, emails, text messages, etc.), documents, etc. In some embodiments, the data may be representative of one or more VVs.

The data of the content server 202a may be provided to the network(s) 206a, which in turn may transfer the data to the MEC 210a. As the name/nomenclature implies, the MEC 210a may reside at a location that is proximate to an edge of the network(s) 206a, which may be useful in reducing (e g, minimizing) delays associated with a provisioning of data or services to one or more (requesting) communication devices. The MEC 210a may buffer, or otherwise store, at least a portion of the data associated with the content item(s) to facilitate such a reduction in delay.

The BS 214a may obtain the data associated with a given content item from the MEC 210a and may transmit the data to one or more of the communication devices 218a-1 through 218a-3. While shown separately in FIG. 2A, in some embodiments the BS 214a may be integrated within, or included as part of, the MEC 210a.

As described above, VVs tend to be resource-intensive in terms of network resources (e.g., bandwidth) and device resources (e.g., processor/processing resources) that are used/consumed. For example, relative to a 2D video, the addition of a third dimension in connection with three-dimensional videos implies that the amount of data increases exponentially (e.g., cubically) with each incremental unit of resolution that is provided. However, in many instances a large portion of the data may be irrelevant from a perspective of a user's experience in the playback of the VV. For example, much of a VV might not be consumed during a playback of the VV because, e.g., much of a VV may be outside of a user's field of view (FoV) during the playback. In this respect, aspects of this disclosure may generate a prediction regarding a likely viewpoint that a user will utilize (e.g., navigate to) during a playback of a VV. The prediction of the viewpoint may be based on one or more factors/parameters, such as for example an identification of a current viewpoint in the playback, a user's history of consumed media, one or more user profiles (potentially in conjunction with one or more social media sites/platforms), user commands or feedback, revenue-generating opportunities (e.g., selective advertisement placement opportunities within the VV), an occurrence of an event and/or a condition (or, analogously, a lack thereof), etc.

Once the predicted viewpoint is generated, data associated with the VV that is outside of the predicted viewpoint may be disregarded/ignored or deemphasized. To demonstrate, a deemphasis of the data that is outside of the predicted viewpoint may entail processing that data to facilitate a low-resolution rendering of that data by a client device/user equipment. Thus, the predicted viewpoint may enable/provide savings in terms of, e.g., resources by reducing the amount/quantity of data that needs to be transmitted, received, and/or processed. Such a reduction may be orders of magnitude in size relative to the original, baseline data, thereby representing significant savings.

Additionally, further savings/simplifications may be realized by utilizing a multiplane image (MPI) representation in connection with a VV, or a portion thereof, such as for example in connection with a predicted viewpoint of the VV. An MPI representation may include multiple layers of red green blue-alpha (RGB-A) images, where the layers may be located at various depths (e.g., fixed depths) relative to one another. For example, and referring to FIG. 2B, an MPI representation 200b is shown as including/encompassing a first layer 204b-1, a second layer 204b-2, a third layer 204b-3, and a fourth layer 204b-4, where each of the layers 204b-1 through 204b-4 is located at a different (relative) depth. Each of the layers 204b-1 through 204b-4 may include one or more associated objects, such as for example a first object 208b-1 (illustratively represented as a square), a second object 208b-2 (illustratively represented as a triangle), a third object 208b-3 (illustratively represented as a circle), and a fourth object 208b-4 (illustratively represented as a parallelogram).

Figure 2B:
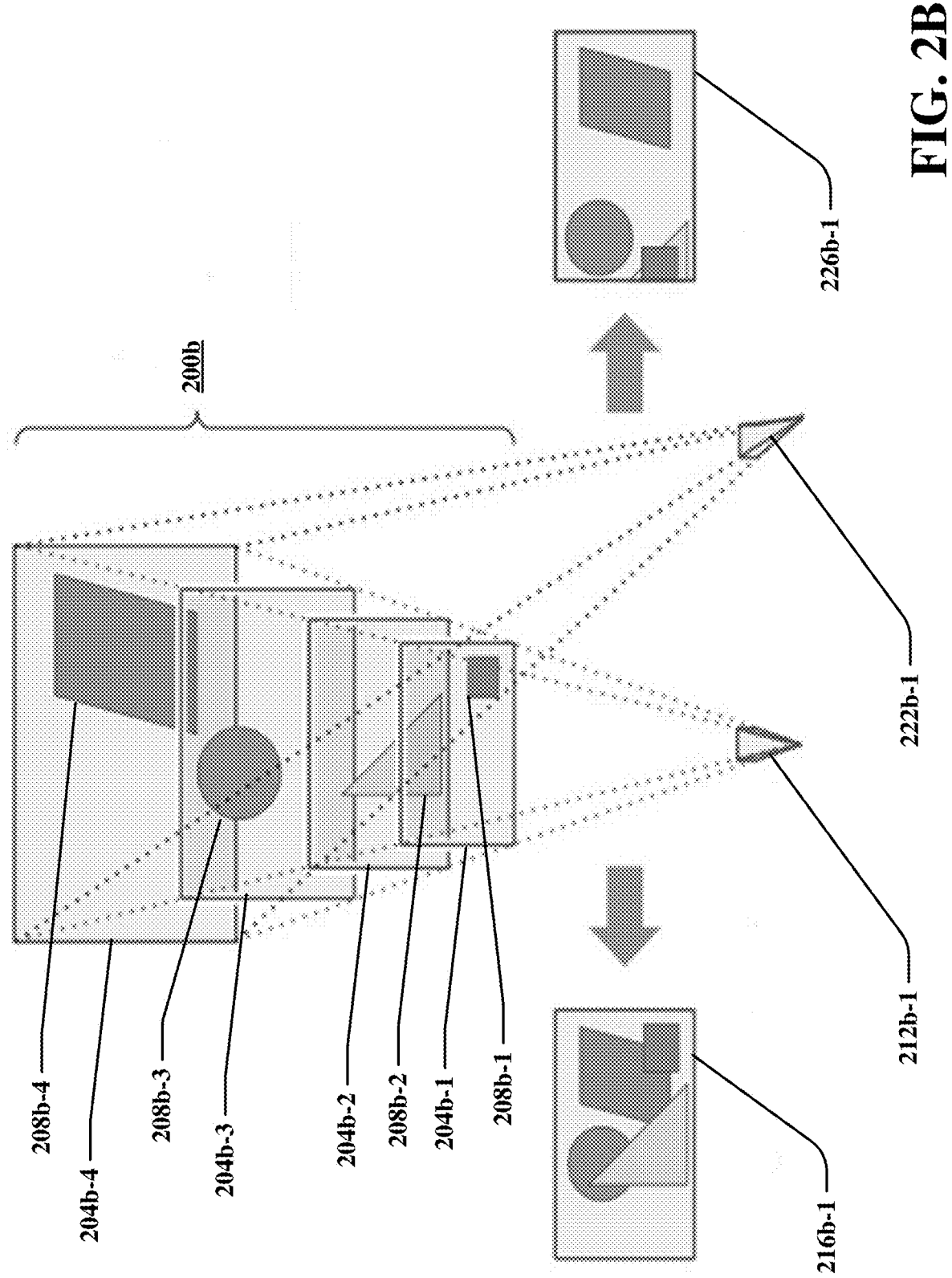
FIG. 2B illustrates a multiplane image (MPI) representation of a content item from various viewpoints in accordance with aspects of this disclosure.

As one skilled in the art would appreciate based on a review of this disclosure, during a playback of the VV associated with the MPI layers of FIG. 2B, a high-quality/high-resolution, new viewpoint may be generated, where the new viewpoint may correspond to a predicted viewpoint as described above. For example, as shown in FIG. 2B, a first (e.g., reference) viewpoint 212b-1 may coincide with/correspond to a first composite image 216b-1, whereas a second (e.g., predicted) viewpoint 222b-1 that is different (e.g., offset) from the first viewpoint 212b-1 may coincide with/correspond to a second composite image 226b-1. As used in this context, the term composite refers to the combination of the layers of RGB-A images through image-warping and alpha blending.

As represented in FIG. 2B, each of the images 216b-1 and 226b-1 may be based on the layers 204b-1 through 204b-4, and may include the objects 208b-1 through 208b-4. However, due to the use of the different perspectives 212b-1 and 222b-1, the objects 204b-1 through 204b-4 appear with different positions (relative to one another) in the second composite image 226b-1 as compared to the first composite image 216b-1.

MPI processing may be performed by two-dimensional (2D) compatible graphics hardware/firmware. Thus, by utilizing MPI processing in accordance with aspects of this disclosure, legacy infrastructure may be utilized. Stated slightly differently, aspects of this disclosure may be implemented/practiced/realized without incurring any additional cost in terms of having to retrofit legacy assets or equipment with 3D compatible graphics hardware/firmware.

In some embodiments, MPI transcoding that is performed with respect to a content item (e.g., a VV) may be agnostic to an original representation of the content item. In this regard, aspects of MPI processing (e.g., transcoding) may be performed on a wide variety and type of video formats. To the extent that MPI is applied to a portion of a VV, such as for example a predicted viewpoint of the VV, a tolerance may be built-in to accommodate inaccuracy in the prediction of the viewpoint without a loss of resolution. Stated slightly differently, aspects of the disclosure may facilitate a high-quality rendering of a new viewpoint, even when the new viewpoint is different from the predicted viewpoint. Still further, aspects of MPI processing may provide for efficiency in terms of network resource utilization by utilizing approximately the same amount of bandwidth for a VV of this disclosure as a 2D/pixel video. Thus, a VV generated/rendered in accordance with aspects of this disclosure may provide for a data-rich feature-set while not incurring much, if any, additional penalty/cost in terms of resource requirements.

Figure 2C:
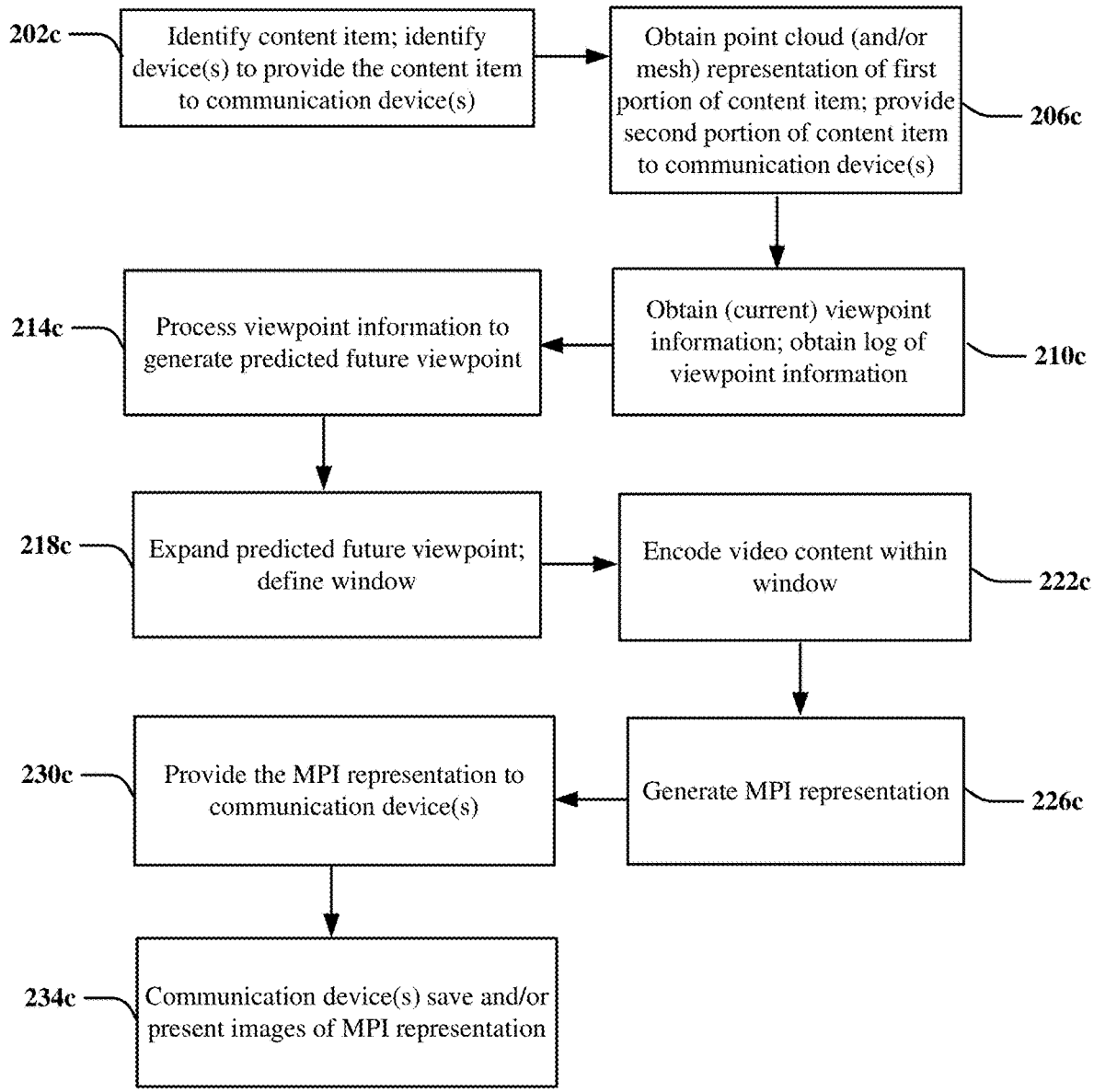
FIG. 2C depicts an illustrative embodiment of a method in accordance with various aspects described herein.

Referring now to FIG. 2C, a flowchart of a method 200c in accordance with aspects of this disclosure is shown. The method 200c may be executed to facilitate a presentation (e.g., an audiovisual rendering) of one or more content items, such as one or more VVs, by a communication device. In some embodiments, aspects of the method 200c may be implemented or executed by one or more systems, devices, and/or components, such as for example the systems, devices, and components described herein. For the sake of convenience in illustration and description, aspects of the method 200c are described below in relation to devices of the system 200a of FIG. 2A.

In block 202c, a content item (e.g., a VV) may be identified. For example, a unique identifier may distinguish the content item from other content items. The content item may be identified based on a request obtained for the content item. Such a request may originate from, e.g., a selection made within an electronic programming guide (EPG), an interactive programming guide (IPG), a menu, etc.

As part of block 202c, one or more devices may be identified as a (proxy) server for providing at least a portion, and potentially even all, of the identified content item a communication device (e.g., first communication device 218a-1 of FIG. 2A). For example, the MEC 210a of FIG. 2A may be identified as part of block 202c based on the MEC 210a being in proximity (e.g., geographical proximity or network proximity) to the first communication device 218a-1. Still further, in some embodiments, the MEC 210a may be identified as part of block 202c based on the MEC 210a utilizing a communication technology that is compatible/common with the first communication device 218a-1. In some embodiments, loads experienced by, e.g., MECs may be considered as part of selecting/identifying the MEC 210a in block 202c. While the MEC 210a is referred to in this example, in some embodiments the content server 202a of FIG. 2A may be selected/identified as part of block 202c. Still further, in some embodiments another communication device (e.g., the second communication device 218a-2 of FIG. 2A) may be selected/identified as part of block 202c, potentially as part of one or more peer-to-peer networks.

Figure 2E:
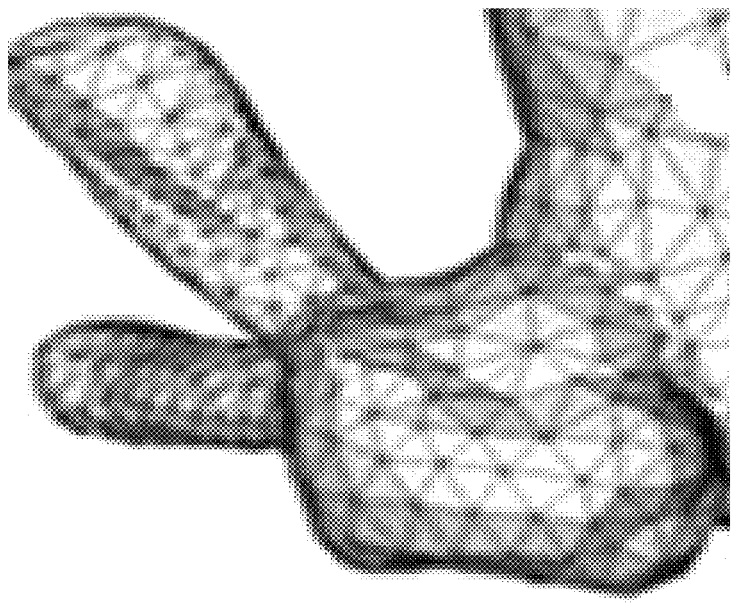
FIG. 2E depicts a mesh representation of the portion of a content item of FIG. 2D in accordance with various aspects set forth herein.
Figure 2D:
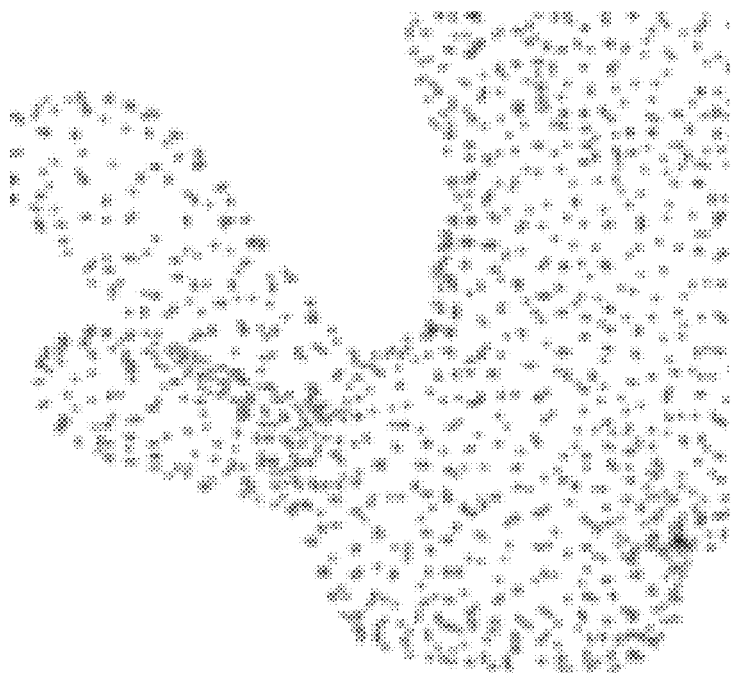
FIG. 2D depicts a point cloud representation of a portion of a content item in accordance with various aspects set forth herein.

In block 206c, the identified device (MEC 210a in this example) of block 202c may obtain (e.g., download) a point cloud representation of at least a part/portion of the content item from, e.g., the content server 202a (see, e.g., FIG. 2D: a point cloud representation 200d of a rabbit's head). The point cloud representation may be supplemented (e.g., overlaid) with additional data to facilitate a mesh representation (see, e.g., FIG. 2E: a mesh representation 200e of the rabbit's head). As one skilled in the art will appreciate based on a comparison of FIG. 2D and FIG. 2E, the mesh representation may add a level of detail—namely, surface ornamentation—that is absent from the point cloud representation.

The obtaining (e.g., downloading) of the data associated with the point cloud representation and/or the mesh representation may occur as data associated with another part/portion of the content item is being provided (e.g., transmitted) to the first communication device 218a-1 in connection with block 206c. The providing of the data of the another part/portion of the content item to the first communication device 218a-1 may include streaming the data of the another part/portion of the content item.

As part of block 206c, the first communication device 218a-1 may present the another part/portion of the content item. As part of block 206c, the first communication device 218a-1 may save/store the another part/portion of the content item, or a variation thereof, to facilitate a future playback/presentation.

In block 210c, the identified device (MEC 210a in this example) of block 202c, or another device, may obtain (e.g., receive) viewpoint information from the communication device (first communication device 218a-1 in this example) that is presenting the content item. For example, in connection with a presentation of visual aspects of the content item, the viewpoint information may identify/include: (1) a unique coordinate in three-dimensional space associated with a current viewing direction/orientation, (2) a size/dimension of a viewport/display device associated with, or integrated within, the first communication device 218a-1, and/or (3) a timestamp associated with a playback (potentially relative to a starting point of the content item or other reference point) of the content item. Still further, a log/record of viewpoint information may be obtained that identifies historical characteristics of the viewpoint information, such as for example a change or trajectory in the viewing direction/orientation over time.

In block 214c, the viewpoint information (and any logs/records thereof) of block 210c may be processed (e.g., analyzed) to generate a predicted future viewpoint (see FIG. 2B: second (e.g., predicted) viewpoint 222b-1). The processing to facilitate the generation of the predicted future viewpoint may be based on an application of one or more machine learning (ML) models, whereby predicted viewpoints may be compared to actual viewpoints, and any error/difference may be provided as feedback in order to enhance the accuracy (e.g., reduce any error) in the prediction in future iterations/executions of the method 200c (e.g., future iterations/executions of block 214c). In this respect, the predicted future viewpoint may tend to become more accurate over time as the model is trained or gains additional experience/data.

In block 218c, the predicted future viewpoint of block 214c may be expanded or enlarged, in one or more dimensions, to mitigate against potential error in the prediction. In some embodiments, the amount or extent of the expansion/enlargement may be selected such that the user of the first communication device 218a-1 might not be able to physically move outside of the expanded predicted future viewpoint.

Figure 2F:
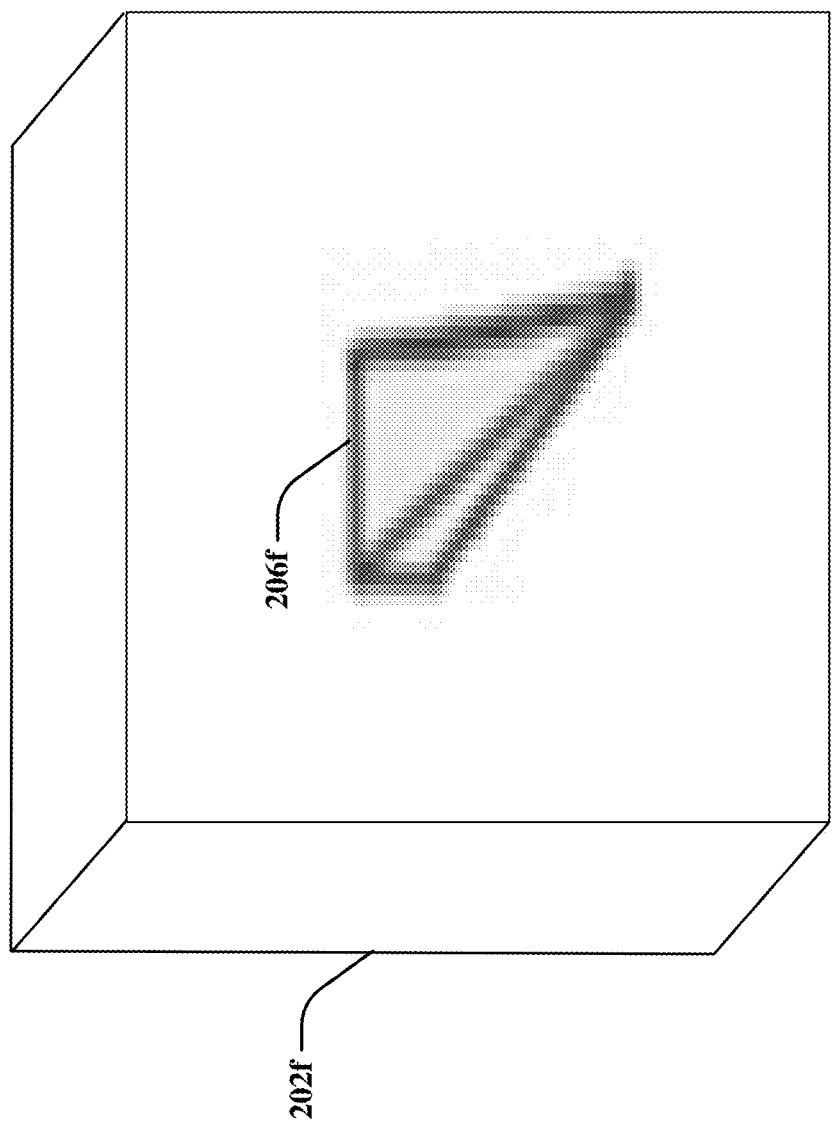
FIG. 2F depicts a window defined about a predicted future viewpoint in accordance with aspects of this disclosure.

The expanded or enlarged predicted future viewpoint may serve to establish one or more thresholds that may define/generate a window within which the predicted future viewpoint resides. For example, and briefly referring to FIG. 2F, an example of a window 202f defined about a predicted future viewpoint 206f is shown. The predicted future viewpoint 206f of FIG. 2F may correspond to the second viewpoint 222b-1 of FIG. 2B. The window 202f may be defined in one or more dimensions (e.g., three dimensions as shown in FIG. 2F). Illustratively, the window 202f is shown as a cube in FIG. 2F. More generally, a window may take one or more forms or shapes in some embodiments.

In some embodiments, a size or dimension of a window (e.g., window 202f of FIG. 2F) of block 218c may be dynamically increased or decreased, resulting in a generation of a modified window. The change in size or dimension may be based on, e.g., a user history, MEC and/or communication device computation capacities, network conditions, etc. For example, the size or dimension of the window may be decreased when the user history suggests there is a high degree of confidence (e.g., confidence in an amount greater than a threshold) in the predicted future viewpoint, the MEC and/or communication device computation capacity is low (e.g., capacity is less than a threshold), and/or network conditions indicate excessive traffic (e.g., traffic in an amount greater than a threshold). Conversely, the size of the window may be increased when the user history suggests there is a low degree of confidence (e.g., confidence in an amount less than a threshold) in the predicted future viewpoint, the MEC and/or communication device computation capacity is high (e.g., capacity is greater than a threshold), and/or network conditions indicate little traffic (e.g., traffic in an amount less than a threshold).

In block 222c, video content included in, e.g., the window of block 218c may be encoded. In some embodiments, if the video content that is included within the window contains low frequency characteristics (e.g., frequency characteristics that are less than a threshold), that video content may be encoded in a low-resolution format. Conversely, if the video content that is included within the window contains high frequency characteristics, that video content may be encoded in a high-resolution format.

In block 226c, an MPI representation of the portion of the content item corresponding to the predicted future viewpoint of block 214c (potentially as enlarged/expanded as part of block 218c) may be generated. For example, as part of generating the MPI representation, a point cloud representation of the portion of the content item may be segmented/sliced at different depths coinciding with the layers of the MPI representation (see FIG. 2A: layers 204b-1 through 204b-4).

In block 230c, images of the MPI representation may be encoded and/or provided (e.g., transmitted) to the first communication device 218a-1. For example, the images of the MPI representation may be streamed to the first communication device 218a-1 as part of block 226c.

In block 234c, the first communication device 218a-1 may decode the images of the MPI representation (to the extent encoding was applied as part of, e.g., block 230c) and cause the decoded images to be presented in conjunction with one or more display devices. In some embodiments, the first communication device 218a-1 (and/or the MEC 210a) may interpolate a given image at different viewpoints to match to subtle changes/movements (e.g., changes/movements less than a threshold) over short periods of time (e.g., a period of time that is less than a threshold). As part of block 234c, the first communication device 218a-1 may save/store the images of the MPI representation, or a variation thereof, to facilitate a future playback/presentation.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In accordance with aspects of this disclosure, data associated with volumetric videos (VVs) may be efficiently transferred over one or more communication networks and efficiently processed and presented by one or more communication devices. Such efficiencies may be realized utilizing viewpoint prediction techniques and MPI representations as set forth herein.

Aspects of this disclosure may be agnostic to a(n original) VV. For example, voxel, point cloud, and/or mesh representations of a VV may be subject to MPI processing in accordance with aspects of this disclosure. MPI processing techniques described herein enable interpolation to be performed on a communication device (e.g., a client device), thereby reducing load on/latency associated with, e.g., an edge device of a network.

Aspects of the disclosure are directed to a prediction of a viewpoint, such as for example a prediction of a viewpoint over a relatively short period of time (e.g., a period of time less than a threshold). Such viewpoint prediction may be extended even further to a future point in time to facilitate a long-term prediction (e.g., a prediction that is referenced to a point in time that is greater than a threshold relative to a current time). Machine learning techniques may be utilized to mitigate against noise or inaccuracy that might otherwise accompany such a long-term prediction, thereby providing for a robust long-term prediction solution.

Aspects of this disclosure facilitate volumetric experiences (e.g., viewpoint freedom) at high-quality with conventional graphics hardware/software, low memory requirements, low processing resource requirements, and low bandwidth requirements. As such, VVs may readily be presented on resource-constrained devices, such as mobile devices.

While some of the examples described herein relate to a generation, transmission, reception, and presentation of an MPI representation of a video (e.g., a VV), in some embodiments multiple MPI representations may be used to enrich/augment the quality of the video. For example, a first MPI representation may correspond to a main/primary version of a video, and one or more secondary MPI representations may correspond to additional objects that may be superimposed within the main video. In some embodiments, the secondary MPI representations may include/correspond to virtual/augmented reality objects that may be selectively added to the main video.

In some embodiments, MPI representations may be combined with aspects associated with a tier or quality of service. For example, a given client device may be enabled to receive a high quality (e.g., a high resolution) version of a video subject to payment of a subscription or license fee. In some embodiments, the quality or resolution of the video that is provided may be a function of network traffic/congestion. For example, during periods of high network traffic/congestion a low resolution version may be provided to a client device, whereas during periods of light/little network traffic/congestion higher resolution versions may be provided to the client device. In some embodiments, the quality or resolution of the video that is provided may be a function of a capability of the client device. For example, if a client device lacks a given display capability, it might not make sense to send to the client device a version of the video that includes that capability.

Aspects of the disclosure may incorporate models that may provide hints/suggestions/recommendations in connection with planar slices for MPI and pose. For example, a data reduction model may be generated such that not every pose at regular intervals needs to be generated. Instead, such poses may be inferred via interpolation in accordance with expected quality metrics.

While some of the examples set forth herein pertain to a video (e.g., visual renderings), aspects of the disclosure may be applied to audio. For example, aspects of MPI may be applied to reduce complex, volumetric audio channels. The reduced audio may be easier/simpler for a client device to process and render/output via, e.g., a speaker.

Embodiments of this disclosure may selectively employ/incorporate MPI processing techniques. For example, if a scene in a video is relatively simple (e.g., includes low frequency components with a limited number of objects), it may make sense to provide the data associated with that scene without applying MPI techniques. Conversely, if the scene is complex, MPI techniques may be utilized.

Aspects of this disclosure may be used to reduce a complex volumetric space into slices/segments that may be rendered with MPI techniques. Aspects of the disclosure may have a substantially constant scale, even with very complex point cloud or volumetric sources, because the base unit of an MPI representation is an image.

Aspects of the disclosure facilitate a transmission of a wider range of poses that allow for both more nuanced/small viewpoint changes (e.g., subtle changes are more readily perceived) and dramatic/large viewpoint changes (e.g., large changes are accommodated without an appreciable loss in quality), with quality of service (QoS) adaptable in connection with an MPI encoding scheme that may be utilized.

Aspects of the disclosure may require less precision in terms of a viewpoint prediction relative to conventional techniques as applied to VVs. Furthermore, aspects of the disclosure provide simpler (e.g., faster, lower complexity) models for predicting a viewpoint to be utilized at a client device or in a cloud/network device.

Aspects of the disclosure may be employed/practiced in connection with one or more architectures, such as for example a client-server architecture, a distributed processing network architecture, a peer-to-peer network, etc. For example, in some embodiments an MPI representation of a content item may be distributed amongst a set of processors or devices. A fault-tolerant assembly process may be performed at a communication device (e.g., a client device) to facilitate a playback of the content item.

Aspects of the disclosure may be applied in connection with one or more advertising models. For example, in some embodiments a user of a communication device may obtain commercial-free content items by paying a subscription or license fee and/or enrolling/subscribing to one or more services. Thus, aspects of the disclosure may be used to monetize the creation and distribution of content items by selectively generating versions/representations of portions/parts of content items, supplemented by advertisements/commercials as warranted/needed. In some embodiments, one or more representations of (e.g., one or more images associated with) a content item may include a link to, e.g., a website, that may facilitate ordering/purchasing a product or service associated with a sponsor of an advertisement.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200c presented in FIGS. 1, 2A, and 2C. For example, virtualized communication network 300 can facilitate in whole or in part identifying a first portion of a volumetric video to be provided to a communication device, obtaining a first representation of the first portion of the volumetric video based on the identifying, obtaining viewpoint information associated with a second portion of the volumetric video from the communication device, processing the viewpoint information to generate a predicted viewpoint associated with the first portion of the volumetric video, generating a second representation of the first portion of the volumetric video based on the predicted viewpoint, wherein the second representation comprises a first multiplane image (MPI) representation of a first part of the first portion of the volumetric video, and providing the second representation of the first portion of the volumetric video to the communication device. Virtualized communication network 300 can facilitate in whole or in part transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device. Virtualized communication network 300 can facilitate in whole or in part obtaining, by a processing system including a processor, a first representation of a first portion of a content item that is compatible with a three-dimensional (3D) space, obtaining, by the processing system, information indicative of a first orientation of a user during a presentation of a second portion of the content item at a user equipment, analyzing, by the processing system, the information to generate a prediction of a second orientation of the user during a presentation of the first portion of the content item at the user equipment, transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation, and transmitting, by the processing system, the second representation of the first portion of the content item to the user equipment to facilitate the presentation of the first portion of the content item at the user equipment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
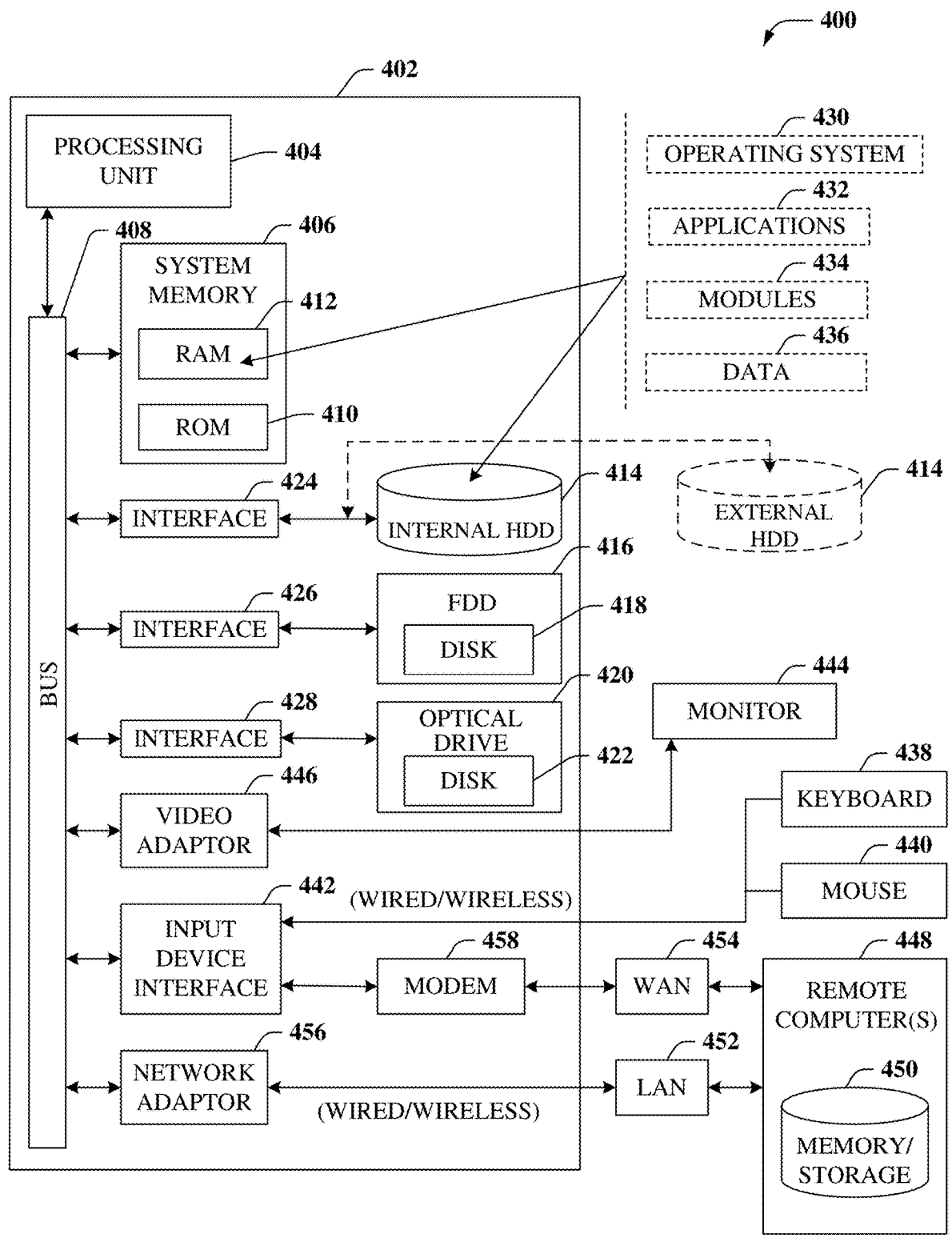
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a first portion of a volumetric video to be provided to a communication device, obtaining a first representation of the first portion of the volumetric video based on the identifying, obtaining viewpoint information associated with a second portion of the volumetric video from the communication device, processing the viewpoint information to generate a predicted viewpoint associated with the first portion of the volumetric video, generating a second representation of the first portion of the volumetric video based on the predicted viewpoint, wherein the second representation comprises a first multiplane image (MPI) representation of a first part of the first portion of the volumetric video, and providing the second representation of the first portion of the volumetric video to the communication device. Computing environment 400 can facilitate in whole or in part transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device. Computing environment 400 can facilitate in whole or in part obtaining, by a processing system including a processor, a first representation of a first portion of a content item that is compatible with a three-dimensional (3D) space, obtaining, by the processing system, information indicative of a first orientation of a user during a presentation of a second portion of the content item at a user equipment, analyzing, by the processing system, the information to generate a prediction of a second orientation of the user during a presentation of the first portion of the content item at the user equipment, transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation, and transmitting, by the processing system, the second representation of the first portion of the content item to the user equipment to facilitate the presentation of the first portion of the content item at the user equipment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
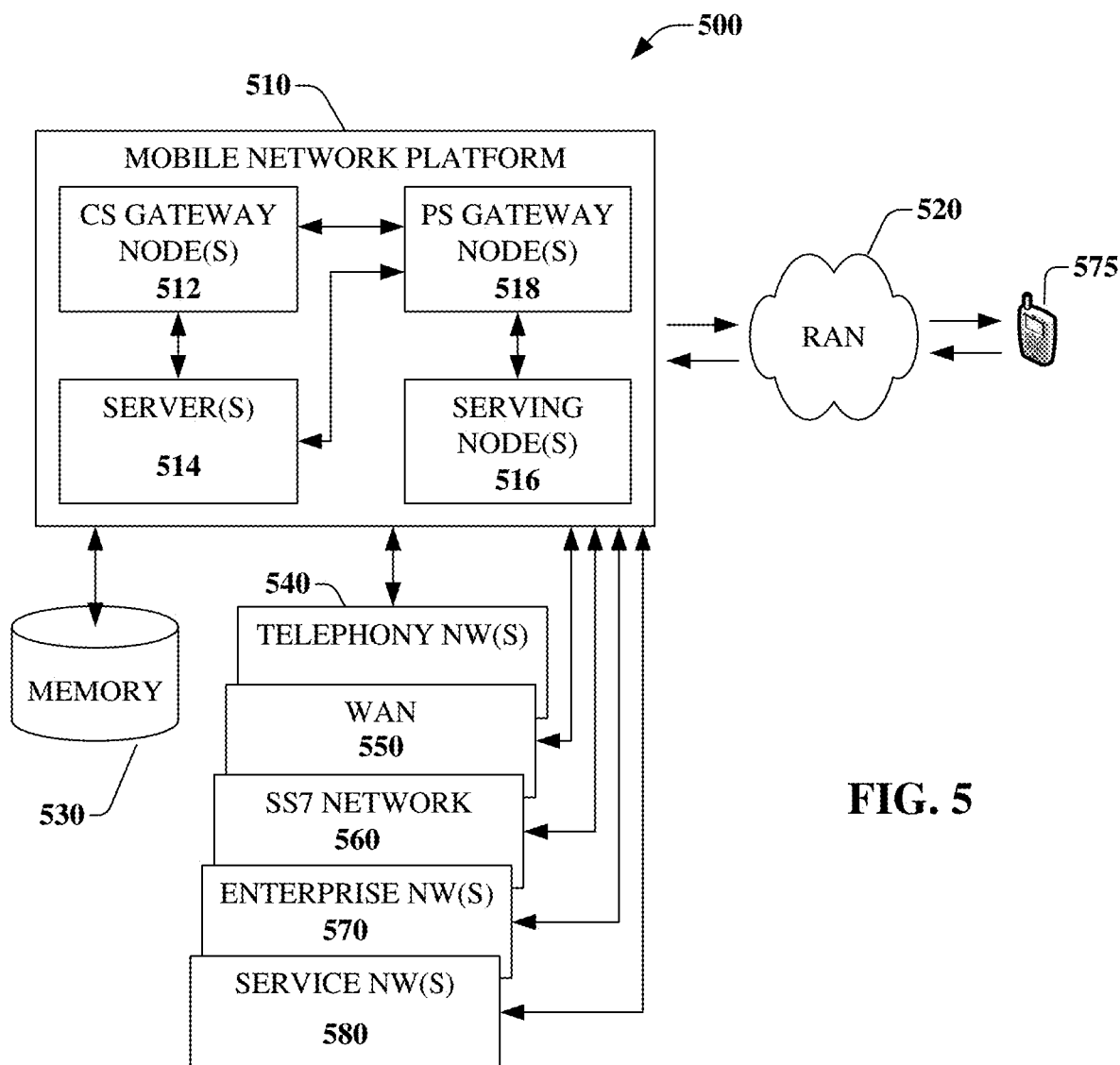
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a first portion of a volumetric video to be provided to a communication device, obtaining a first representation of the first portion of the volumetric video based on the identifying, obtaining viewpoint information associated with a second portion of the volumetric video from the communication device, processing the viewpoint information to generate a predicted viewpoint associated with the first portion of the volumetric video, generating a second representation of the first portion of the volumetric video based on the predicted viewpoint, wherein the second representation comprises a first multiplane image (MPI) representation of a first part of the first portion of the volumetric video, and providing the second representation of the first portion of the volumetric video to the communication device. Platform 510 can facilitate in whole or in part transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device. Platform 510 can facilitate in whole or in part obtaining, by a processing system including a processor, a first representation of a first portion of a content item that is compatible with a three-dimensional (3D) space, obtaining, by the processing system, information indicative of a first orientation of a user during a presentation of a second portion of the content item at a user equipment, analyzing, by the processing system, the information to generate a prediction of a second orientation of the user during a presentation of the first portion of the content item at the user equipment, transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation, and transmitting, by the processing system, the second representation of the first portion of the content item to the user equipment to facilitate the presentation of the first portion of the content item at the user equipment.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
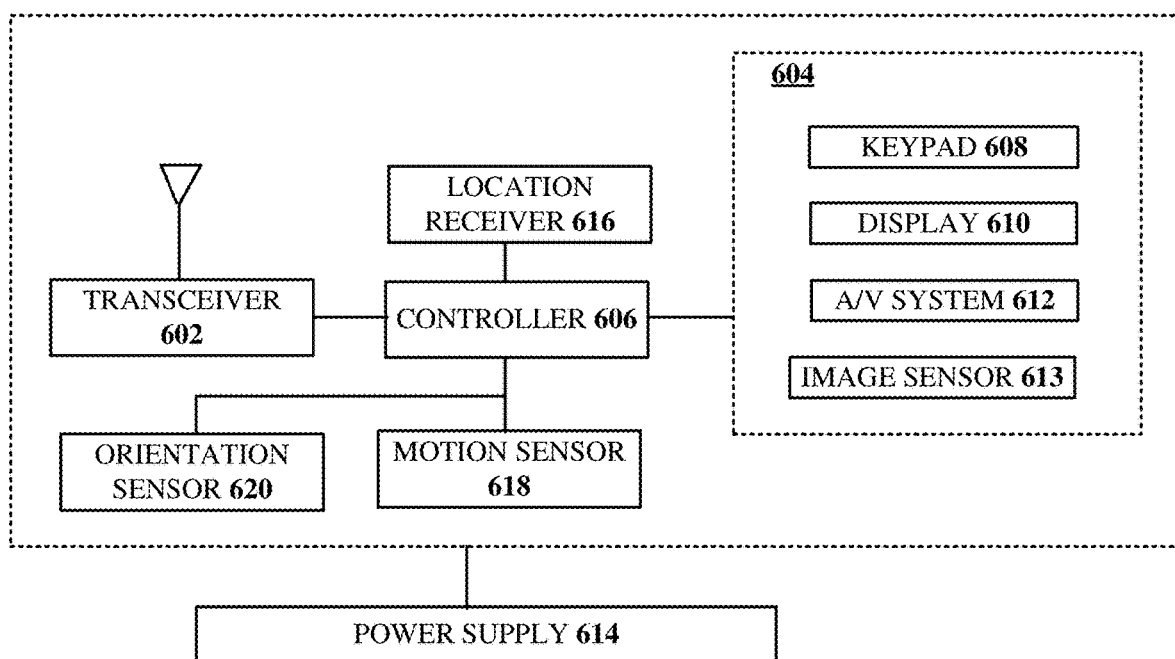
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying a first portion of a volumetric video to be provided to a communication device, obtaining a first representation of the first portion of the volumetric video based on the identifying, obtaining viewpoint information associated with a second portion of the volumetric video from the communication device, processing the viewpoint information to generate a predicted viewpoint associated with the first portion of the volumetric video, generating a second representation of the first portion of the volumetric video based on the predicted viewpoint, wherein the second representation comprises a first multiplane image (MPI) representation of a first part of the first portion of the volumetric video, and providing the second representation of the first portion of the volumetric video to the communication device. Computing device 600 can facilitate in whole or in part transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, receiving, from the device, a multiplane image (MPI) representation of a second portion of the 3D video responsive to the transmitting of the viewpoint information, and providing an image of the MPI representation to a display device. Computing device 600 can facilitate in whole or in part obtaining, by a processing system including a processor, a first representation of a first portion of a content item that is compatible with a three-dimensional (3D) space, obtaining, by the processing system, information indicative of a first orientation of a user during a presentation of a second portion of the content item at a user equipment, analyzing, by the processing system, the information to generate a prediction of a second orientation of the user during a presentation of the first portion of the content item at the user equipment, transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation, and transmitting, by the processing system, the second representation of the first portion of the content item to the user equipment to facilitate the presentation of the first portion of the content item at the user equipment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a first portion of a volumetric video to be provided to a communication device;
obtaining a first representation of the first portion of the volumetric video based on the identifying;
obtaining viewpoint information associated with a second portion of the volumetric video from the communication device;
processing the viewpoint information to generate a predicted viewpoint associated with the first portion of the volumetric video;
defining a window about the predicted viewpoint;
modifying a size or a dimension of the window based on a first computation capacity of the device, a second computation capacity of the communication device, or a combination thereof, resulting in a modified window;
generating a second representation of the first portion of the volumetric video based on the predicted viewpoint and the modified window, wherein the second representation comprises a first multiplane image (MPI) representation of a first part of the first portion of the volumetric video; and
providing the second representation of the first portion of the volumetric video to the communication device.

2. The device of claim 1, wherein the communication device is a mobile device.

3. The device of claim 2, wherein the device is an edge device of a network, and wherein the providing of the second representation of the first portion of the volumetric video to the communication device occurs over the network.

4. The device of claim 1, wherein the first portion of the volumetric video occurs subsequent to the second portion of the volumetric video in a playback of the volumetric video at the communication device.

5. The device of claim 1, wherein the viewpoint information comprises:
a coordinate in three-dimensional space associated with a viewing direction in relation to the second portion of the volumetric video,
a size, a dimension, or a combination thereof, of a viewport associated with the communication device, and
a timestamp associated with a playback of the volumetric video.

6. The device of claim 1, wherein the first representation of the first portion of the volumetric video comprises a point cloud representation, a mesh representation, or a combination thereof.

7. The device of claim 1, wherein the modifying is further based on a history of a user associated with the communication device, a network condition, or a combination thereof.

8. The device of claim 1, wherein the processing of the viewpoint information comprises applying the viewpoint information to a machine learning model to generate the predicted viewpoint.

9. The device of claim 1, wherein the operations further comprise:
encoding the second representation of the first portion of the volumetric video, resulting in an encoded second representation,
wherein the providing of the second representation of the first portion of the volumetric video to the communication device comprises providing the encoded second representation to the communication device.

10. The device of claim 1, wherein the second representation comprises a second MPI representation of a second part of the first portion of the volumetric video, and wherein the second part comprises a virtual object that is configured to be overlaid on the first part.

11. The device of claim 1, wherein the second representation comprises a second MPI representation of the first portion of the volumetric video, wherein the first MPI representation comprises first data associated with a first resolution version of the first portion of the volumetric video, wherein the second MPI representation comprises second data associated with a second resolution version of the first portion of the volumetric video, and wherein the second resolution version is different from the first resolution version.

12. The device of claim 1, wherein the second representation of the first portion of the volumetric video is commercial-free, and wherein the generating of the second representation of the first portion of the volumetric video is further based on a determination that a user of the communication device is subscribed to a service.

13. A non-transitory machine-readable medium, comprising executable instructions that, when executed by a processing system including a processor, facilitate performance of operations, the operations comprising:

transmitting viewpoint information associated with a first portion of a three-dimensional (3D) video to a device, wherein the viewpoint information comprises a first coordinate in 3D space associated with a first viewing direction in a playback of the first portion and a first timestamp associated with the first portion, wherein the device processes the viewpoint information to generate a predicted viewpoint, wherein the device defines a window about the predicted viewpoint, and wherein the device modifies a size or a dimension of the window based on a first computation capacity of the device, a second computation capacity of the processing system, or a combination thereof, resulting in a modified window;

receiving, from the device, a multiplane image (MPI) representation of a second portion of the 3D video responsive to the transmitting of the viewpoint information, wherein the MPI representation is based on the modified window; and providing an image of the MPI representation to a display device.

14. The non-transitory machine-readable medium of claim 13, wherein the operations further comprise:

processing the MPI representation via two-dimensional (2D) compatible graphics hardware, firmware, or a combination thereof, wherein the providing of the image of the MPI representation to the display device is based on the processing of the MPI representation.

15. The non-transitory machine-readable medium of claim 13, wherein the second portion of the 3D video comprises an advertisement, and wherein the image includes a selectable link to a web site associated with a sponsor of the advertisement.

16. The non-transitory machine-readable medium of claim 13, wherein the viewpoint information comprises a second coordinate in 3D space associated with a second viewing direction in a playback of a third portion of the 3D video and a second timestamp associated with the third portion, wherein the second viewing direction is different from the first viewing direction, and wherein the second timestamp is different from the first timestamp.

17. A method, comprising:

obtaining, by a processing system including a processor, a first representation of a first portion of a content item that is compatible with a three-dimensional (3D) space;

obtaining, by the processing system, information indicative of a first orientation of a user during a presentation of a second portion of the content item at a user equipment;

analyzing, by the processing system, the information to generate a prediction of a second orientation of the user during a presentation of the first portion of the content item at the user equipment;

defining, by the processing system, a window based on the prediction;

modifying, by the processing system, a size or a dimension of the window based on a first computation capacity of the processing system, a second computation capacity of the user equipment, or a combination thereof, resulting in a modified window;

transforming, by the processing system, the first representation of the first portion of the content item to a second representation of the first portion of the content item that is compatible with two-dimensional (2D) hardware of the user equipment, 2D firmware of the user equipment, or a combination thereof, wherein the second representation of the first portion of the content item is based on the prediction of the second orientation and the modified window; and transmitting, by the processing system, the second representation of the first portion of the content item to the user equipment to facilitate the presentation of the first portion of the content item at the user equipment.

18. The method of claim 17, wherein the first portion of the content item comprises a volumetric video, and wherein the second representation of the first portion of the content item comprises a multiplane image (MPI) representation of the volumetric video.

19. The method of claim 17, wherein the modifying is based on the first computation capacity of the processing system.

20. The method of claim 17, wherein the modifying is based on the second computation capacity of the user equipment.

* * * * *